(12) United States Patent
Zheng et al.

(10) Patent No.: US 12,175,504 B2
(45) Date of Patent: Dec. 24, 2024

(54) UNSUPERVISED EMBEDDINGS DISENTANGLEMENT USING A GAN FOR MERCHANT RECOMMENDATIONS

(71) Applicant: Visa International Service Association, San Francisco, CA (US)

(72) Inventors: Yan Zheng, Sunnyvale, CA (US); Yuwei Wang, San Francisco, CA (US); Wei Zhang, Fremont, CA (US); Michael Yeh, Palo Alto, CA (US); Liang Wang, San Jose, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 18/085,034

(22) Filed: Dec. 20, 2022

(65) Prior Publication Data

US 2023/0153870 A1    May 18, 2023

Related U.S. Application Data

(63) Continuation of application No. 16/688,847, filed on Nov. 19, 2019, now Pat. No. 11,593,847.
(Continued)

(51) Int. Cl.
  *G06Q 30/00*    (2023.01)
  *G06Q 30/0201*  (2023.01)
  *G06Q 30/0282*  (2023.01)

(52) U.S. Cl.
  CPC ..... *G06Q 30/0282* (2013.01); *G06Q 30/0201* (2013.01)

(58) Field of Classification Search
  CPC ............... G06Q 30/0282; G06Q 30/0201
  See application file for complete search history.

(56) References Cited

U.S. PATENT DOCUMENTS 6,839,682 B1 *  1/2005  Blume ............... G06Q 30/0255
                                                    705/26.1
10,339,586 B1 * 7/2019  Khobragade ...... G06Q 30/0631
(Continued)

OTHER PUBLICATIONS

"Mobile Marketing recommendation method based on user location feedback," by Chunyong Yin, Shilei Ding, and Jin Wang, Human-centric Computing and Information Sciences, Springer Nature, May 1, 2019 (Year: 2019).*
(Continued)

*Primary Examiner* — Anne M Georgalas
(74) *Attorney, Agent, or Firm* — Schwabe Williamson & Wyatt, PC

(57) ABSTRACT

Embodiments for training a recommendation system to provide merchant recommendations comprise receiving, by a processor, raw merchant embeddings and raw user embeddings generated from payment transaction records, wherein the raw merchant embeddings include a plurality of embedded features. A generative adversarial network (GAN) is trained to generate modified merchant embeddings from the raw merchant embeddings, where the modified embeddings remove a location feature. Subsequent to training and responsive to receiving a request for merchant recommendations in the target location for the target user, the GAN and a trained preference model are used to generate a list of merchant rankings based on a new set of modified merchant embeddings, past preferences of a target user, and the target location to recommend merchants in the target location.

17 Claims, 12 Drawing Sheets

Related U.S. Application Data

(60) Provisional application No. 62/895,447, filed on Sep. 3, 2019.

(56) References Cited

U.S. PATENT DOCUMENTS

| | | | |
|---|---|---|---|
| 10,565,471 B1* | 2/2020 | Abdi Taghi Abad | G06N 7/01 |
| 10,650,306 B1 | 5/2020 | Kumar | |
| 10,692,140 B1 | 6/2020 | Kim | |
| 10,789,530 B2* | 9/2020 | Bruss | G06N 3/08 |
| 2015/0220835 A1 | 8/2015 | Wilson | |
| 2017/0148081 A1* | 5/2017 | Chauhan | G06Q 30/0631 |
| 2019/0163832 A1* | 5/2019 | Drake | H04L 67/535 |
| 2020/0065812 A1 | 2/2020 | Walters | |
| 2020/0098010 A1* | 3/2020 | Agarwal | G06Q 30/0261 |

OTHER PUBLICATIONS

Ammar et al., "Massively Multilingual Word Embeddings" CoRR abs/1602.01925; 2016.

Bojanowski et al., "Enriching Word Vectors with Subword Information" TACL 5:135-146; 2017.

Chen et al., "Unsupervised Multilingual Word Embeddings" Proceedings of the 2018 Conference on Empirical Methods in Natural Language Processing, Brussels, Belgium, Oct. 31, Nov. 4, 2018, 261-270. Association for Computational Linguistics.

Conneau, et al., "Word Translation Without Parallel Data" CoRR abs/1710.04087; 2017.

Du, et al., "Pcard: Personalized Restaurant Recommendation from Card Payment Transaction Records" in Proceedings of the 28th International Conference on World Wide Web, 2687-2693; 2019.

Farugui, et al., "Improving Vector Space Word Representations Using Multilingual Correlation" Proceedings of the 14$^{th}$ Conference of the European Chapter of the Association for Computational Linguistics; pp. 462-471; 2014.

Goodfellow, et al., "Generative Adversarial Nets" in Advances in Neural Information Processing Systems 27; Curran Associates, Inc., 2014, pp. 2672-2680.

Harris, "Distributional Structure" Word 10(23):146-162; 1954.

Mikilov, et al., "Distributed Representations of Words and Phrases and their Compositionality" in Advances in Neural Information Processing Systems 26: 27th Annual Conference on Neural Information Processing Systems 2013. Proceedings of a meeting held Dec. 5-8, 2013, Lake Tahoe, Nevada, United States., 3111-3119.

Mikolov et al., "Exploiting Similarities Among Language for Machine Translation" CoRR abs/1309.4168; 2013.

Pennington et al., "GloVe: Global Vectors for Word Representation" in Empirical Methods in Natural Language Processing (EMNLP), 1532-1543; 2014.

Zou, et al., "Bilingual Word Embeddings for Phrase-Based Machine Translation" In EMNLP, 1393-1398; 2013.

Kumar, et al., "eCommerce Gan: a Generative Adversarial Network for E-commerce," ArXiv: 1801.03244v1 [cs. LG], Apr. 2018; 10 pages.

Yin et al., "Mobile marketing recommendation method based on user location feedback," Human-centric Computing and Information Sciences, (2019) 9:14; May 1, 2019; 18 pages.

* cited by examiner

| | SF to NY (with noise) | | | | SF to NY (without noise) | | | |
|---|---|---|---|---|---|---|---|---|
| | N@1 | N@5 | N@10 | ACC@L | N@1 | N@5 | N@10 | ACC@L |
| baseline | 108 | 366 | 564 | 84.20% | 582 | 1702 | 2230 | |
| alpha=0, beta=1 | 405 | 808 | 908 | 80.55% | 520 | 1278 | 1483 | |
| alpha=1, beta=1 | 332 | 1031 | 1461 | 71.63% | 671 | 1825 | 2329 | |
| alpha=2.5, beta=1 | 304 | 978 | 1425 | 70.60% | 652 | 1821 | 2345 | |
| alpha=5, beta=1 | 258 | 819 | 1219 | 72.10% | 656 | 1797 | 2333 | |

| | west to east | | | |
|---|---|---|---|---|
| | N@1 | N@5 | N@10 | ACC@L |
| baseline | 4566 | 7778 | 7974 | 99.62% |
| alpha=0, beta=1 | 3889 | 7605 | 7942 | 68.50% |
| alpha=1, beta=1 | 4240 | 7576 | 7941 | 59.85% |
| alpha=2.5, beta=1 | 4259 | 7625 | 7929 | 58.03% |
| alpha=5, beta=1 | 4394 | 7688 | 7939 | 63.36% |

UNSUPERVISED EMBEDDINGS DISENTANGLEMENT USING A GAN FOR MERCHANT RECOMMENDATIONS

CROSS-REFERENCE TO RELATED APPLICATIONS

This application is a Continuation of patent application Ser. No. 16/688,847, filed Nov. 19, 2019, which claims the befit of provisional Patent Application Ser. No. 62/895,447, filed Sep. 3, 2019, both assigned to the assignee of the present application, and incorporated herein by reference.

BACKGROUND

Personalized restaurant recommendation systems aim to suggest restaurants to end users based on their own preferences, which automatically could provide each target user a personalized ranked list of recommended restaurants based on information learned from a user's behavior history. Most traditional recommendation systems use collaborative filtering, which recommend a user with unexplored items that are liked by other users having similar tastes. Examples of commercial use of collaborative filtering include Amazon® rating scores, Yelp® reviews, and Netflix® movie ratings. To achieve adequate results, collaborative filtering needs sufficient rating scores to find similar users. However, explicit ratings or reviews are often not available, and could be highly biased. Implicit ratings have been proposed for the aforementioned problem. An example of implicit ratings is YouTube's recommendation system that treats a video as being liked by a user if the user finishes that video. Similarly, if a webpage is being scrolled to the end, then it is likely that webpage is being liked.

However, point-of-interest (POI) recommendation systems are more complicated, especially for restaurant recommendations, partly due to the complexity introduced by geographical location factors. For restaurant recommendations, some systems model geographical preferences of users using user check-in data on location-based social networks, but they treat locations that users have been to as what users are likely to prefer. For more accurate recommendations, implicit check-in data may be integrated with explicit review data, while analyzing user preferences based on their demographics information and restaurants attributes. Still, results may be lacking.

Deep learning has been gradually replacing many traditional algorithms in various tasks including recommendation systems. Despite of the successful results, these methods still need either explicit ratings or implicit ones to begin with, however.

Accordingly, what is needed is a merchant recommendation system that suggests merchants to end users based on user preferences without requiring any user reviews or rating data.

BRIEF SUMMARY

Disclosed embodiments provides methods and systems for training a recommendation system to provide merchant recommendations comprises receiving, by a processor, raw merchant embeddings and raw user embeddings generated from payment transaction records, wherein the raw merchant embeddings include a plurality of embedded features. A generative adversarial network (GAN) is trained to generate modified merchant embeddings from the raw merchant embeddings, where the modified embeddings remove a location feature. Subsequent to training and responsive to receiving a request for merchant recommendations in the target location for the target user, the GAN and a trained preference model are used to generate a list of merchant rankings based on a new set of modified merchant embeddings, past preferences of a target user, and the target location to recommend merchants in the target location.

According to the disclosed embodiments, the GAN is trained to remove an effect of an identified feature, such as location, implicitly embedded in raw merchant embeddings. With location removed from the merchant embedding, the merchant embeddings are aligned on the other features of the embeddings, such as cuisine style and/or cost, for example, in an embedding space. This, in turn, enables a merchant recommendations system to recommend similar merchants/restaurants for cardholders when traveling in cities away from their home cities.

DETAILED DESCRIPTION

Figure 1:
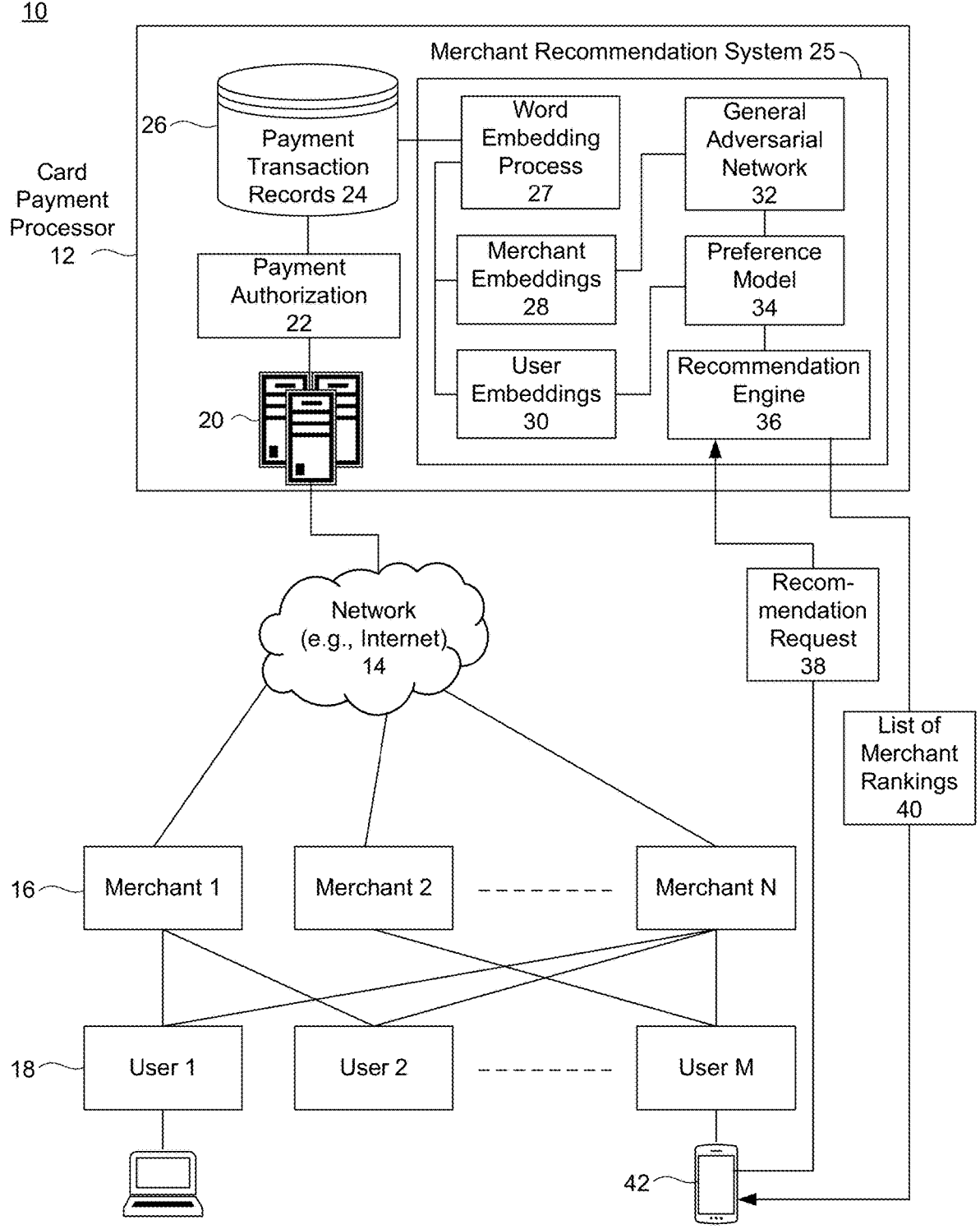
FIG. 1 is a diagram of one embodiment of a card payment processing system in which the disclosed embodiments may be implemented.

The disclosed embodiments relate to unsupervised embeddings disentanglement using a GAN for merchant recommendation. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

A natural language processing technique called word embedding has been applied to payment transaction data to generate raw merchant embeddings in order to learn distributed representations of merchants. As word embedding encodes the syntactic and semantic information, the raw merchant embeddings are represented as vectors that include a plurality of encoded features about merchants such as location, price and cuisine type, for instance. Merchant embedding from the same location (e.g., a city) will be grouped together in the embedding space. This is appropriate when recommending restaurants to users when the users who are present in their home city, but it can be problematic when recommending restaurants to users when the users are traveling away from their home city.

According to the disclosed embodiments, an unsupervised generative adversarial network (GAN) disentanglement process is provided to detect and remove the effect of one of those features, such as location for example, from the merchant embeddings. The disentanglement process performed the GAN generates modified merchant embeddings that are free of the identified feature such that the modified merchant embeddings from different locations (e.g., cities) are aligned together based on the other features. During the process, merchant embeddings are essentially mapped from one embedding space to another embedding space, while retaining all the other encoded features of the merchants, such as price and cuisine type, in the vector representations of the embeddings. This disentanglement process enables a merchant recommendations system to recommend similar merchants/restaurants to cardholders, even when the cardholders are away from their home cities.

FIG. 1 is a diagram of one embodiment of a card payment processing system in which the disclosed embodiments may be implemented. The card payment processing system 10 includes a card payment processor 12 in communication (direct or indirect) over a network 14 with a plurality of merchants 16. A plurality of cardholders or users 18 purchase goods and/or services from various ones of the merchants 16 using a payment card such as a credit card, debit card, prepaid card and the like. Typically, the card payment processor 12 provides the merchants 16 with a service or device that allows the merchants to accept payment cards as well as to send payment details to the card payment processor 12 over the network 14. In some embodiments, an acquiring bank or processor (not shown) may forward the credit card details to the card payment processor 12. Payment card transactions may be performed using a variety of platforms such as brick and mortar stores, ecommerce stores, wireless terminals, and user mobile devices. The payment card transaction details sent over the network 14 are received by one or more servers 20 of the payment card processor 12 and processed by, for example, by a payment authorization process 22 and/or forwarded to an issuing bank (not shown). The payment card transaction details are stored as payment transaction records 24 in a transaction database 26. As is well known the servers 20 include memory and processors for executing software components as described herein.

The most basic and common type of payment transaction data is referred to as a level 1 transaction. The basic data fields of a level 1 payment card transaction are: i) merchant name, ii) billing zip code, and iii) transaction amount. Additional information, such as the date and time of the transaction and additional cardholder information may be automatically recorded, but is not explicitly reported by the merchant 16 processing the transaction. A level 2 transaction includes the same three data fields as the level 1 transaction, and in addition, the following data fields may be generated automatically by advanced point of payment systems for level 2 transactions: sales tax amount, customer reference number/code, merchant zip/postal code tax id, merchant minority code, merchant state code.

In one embodiment, the payment processor 12 further includes a merchant recommendation system 25 that provides personalized merchant recommendations to users 18 based on each user's own payment transaction records 24 and past preferences of the user and other users 18. The recommendation engine 36 is capable of recommending any type of merchant, such as hotels, but for purposes of example, the recommendation engine 36 may be described as providing recommendations to restaurant merchants, or simply restaurants.

The merchant recommendation system 25 mines the payment transaction records 24 to: i) to represent each merchant 16 and each user 18 as merchant embeddings 28 and user embeddings 30, respectively, using an embedding scheme performed by a word embedding process 27; and ii) to learn the user preferences for merchants 16. The user preferences are determined by a preference model 34, e.g., a deep neural network (DNN) classifier, and are based only on the payment transaction records 24 without any rating or review data or detailed metadata about the merchants/restaurants.

According to one aspect of the disclosed embodiments, the merchant recommendation system 25 further includes a generative adversarial network (GAN) 32 to perform an unsupervised embeddings disentanglement to modify the merchant embeddings 28 by removing the influence of a feature, such a location information, from the merchant embeddings 28. In one embodiment, the GAN 32 may be implemented in software. In another embodiment, the GAN 32 may be implemented in hardware, or a combination of hardware and software.

Based on the modified merchant embeddings and the raw user embeddings 30, the preference model 34 may determine/learn a target user's preferences for merchants. The learned user preferences may be used by a recommendation engine 36 to provide personalized merchant recommendations, such as restaurant recommendations, for example. The recommendation engine 36 can respond to a merchant recommendation request 38 from a user 18 and provide a list of merchant rankings 40 in response. Alternatively, the recommendation engine 36 may push the list of merchant rankings 40 to one or more target users 18 based on current user location, a recent payment transaction, or other metric. In one embodiment, the user 18 may submit the recommendation request 38 through a payment card application (not shown) running on a user device 42, such as a smartphone or tablet. Alternatively, users 18 may interact with the merchant recommendation system 25 through a conventional web browser.

In one embodiment where the merchant recommendations are for restaurants specifically, the merchant recommendation system 25 may respond to a recommendation request 38 by finding all restaurants within a particular region. The region may be defined to be within a threshold distance of the user's current location or the location may be specified by the user 18. Each pair of restaurants in the region is compared for the user 18 by the preference model 34 to determine which restaurant is preferred by the user 18 based on past user preferences. The recommendation engine 36 then computes a ranked list of all restaurants in the regions based on the pairwise comparison results.

In one embodiment, the wording embedding process 27, the GAN 32, the preference model 34, and the recommendation engine 36 are implemented as software components. In another embodiment, the components could be implemented as a combination of hardware and software. Although the wording embedding process 27, the GAN 32, the preference model 34, and the recommendation engine 36 are shown as separate components, the functionality of each may be combined into a lesser or greater number of modules/components. In addition, although a server 20 is shown hosting the wording embedding process 27, the GAN 32, the preference model 34, and the recommendation engine 36, these components may run on any type of one more computers that have memory and processor.

Both the server 20 and the user devices 42 may include hardware components of typical computing devices (not shown), including a processor, input devices (e.g., keyboard, pointing device, microphone for voice commands, buttons, touchscreen, etc.), and output devices (e.g., a display device, speakers, and the like). The server 20 and user devices 42 may include computer-readable media, e.g., memory and storage devices (e.g., flash memory, hard drive, optical disk drive, magnetic disk drive, and the like) containing computer instructions that implement the functionality disclosed herein when executed by the processor. The server 20 and the user devices 42 may further include wired or wireless network communication interfaces for communication.

Although the server 20 is shown as a single computer, it should be understood that the functions of server 20 may be distributed over more than one server, and the functionality of software components may be implemented using a different number of software components. For example, the GAN 32 may be implemented as more than one component. In an alternative embodiment (not shown), the server 20 and the GAN 32, preference model 34 and reclamation engine 36 of FIG. 1 may be implemented as a virtual entity whose functions are distributed over multiple user devices 42.

Figure 2:
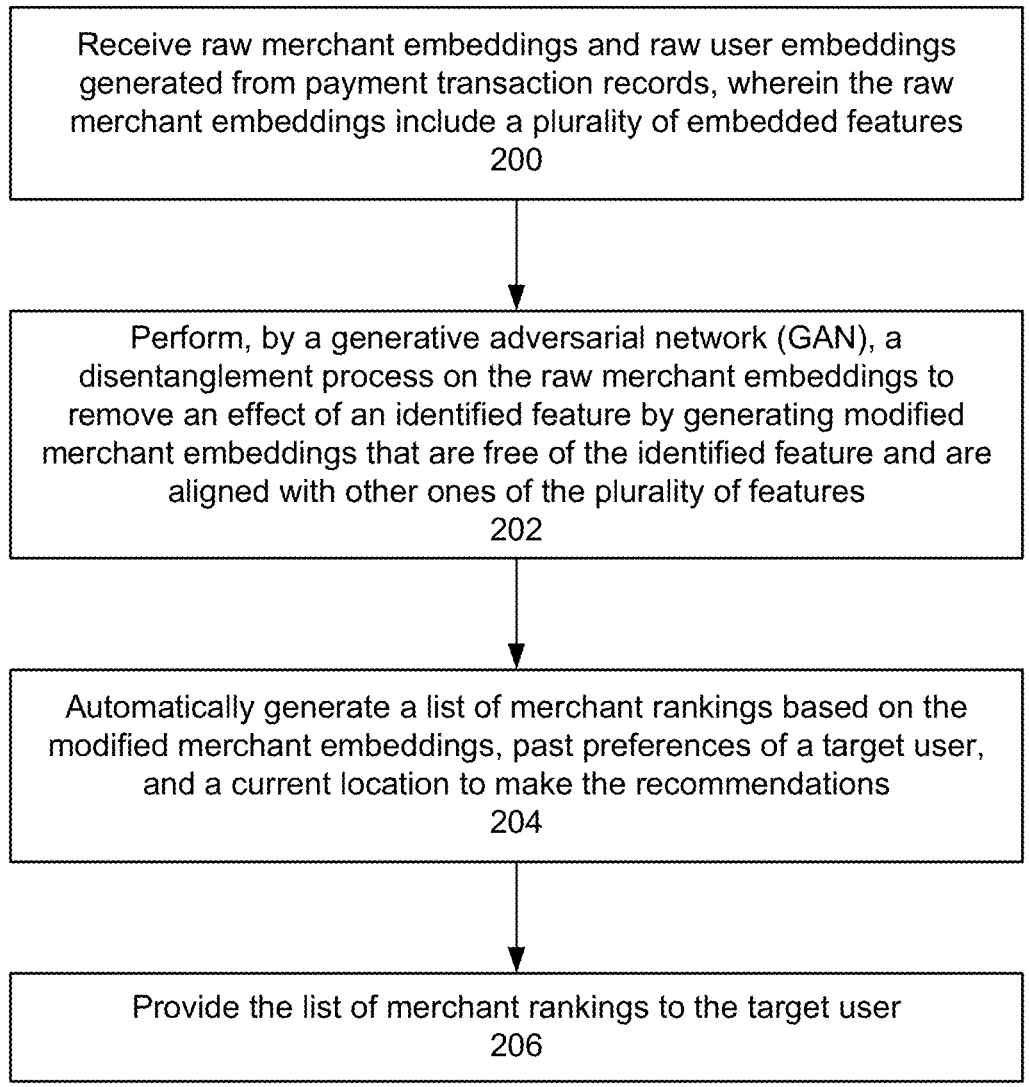
FIG. 2 illustrates a flow diagram of a process for unsupervised embeddings disentanglement using a GAN to generate merchant recommendations to according to one embodiment.

FIG. 2 illustrates a flow diagram of a process for generating merchant recommendations based on payment transaction records using an unsupervised embeddings disentanglement using a GAN according to one embodiment. The process may be performed by one or more processors when configured by the components of the merchant recommendation system 25 that are stored in computer-readable memory of the servers 20 or other computers.

The process may begin by receiving raw merchant embeddings 28 and raw user embeddings 30 generated from the payment transaction records 24 in the transaction database 26, wherein the raw merchant embeddings 28 include a plurality of embedded features (block 200). The merchant recommendation system 25 learns user merchant preferences from the history payment transaction records 24 to generate personalized restaurant recommendations. For example, the merchant recommendation system 25 may have access to millions of payment transactions available in the transaction database 26, among which there may be over 200 million active cardholders (users 18) and more the 75 million active merchants 16 (e.g., restaurants, retailers, online shopping website, and supermarkets). In embodiments, all user identity related information may be processed as hash values, from which user identities cannot be verified.

The unsupervised embeddings disentanglement processing using the GAN may be used to increase the speed and accuracy of the merchant recommendations made to the target user. The target user is associated with a source region where the target user visits merchants most frequently, and the merchant recommendation system 25 is recommending merchants to the target user that are located in the target region. The target user may or may not be currently located in the target region. For example, the target user may request a recommendation from the merchant recommendation system 25 for restaurants in a target region the target user is about the visit. Similarly, the merchant recommendation system 25 may automatically determine that the target user is about to travel to the target region by analyzing the payment transaction records 24 and pushes the recommendation to the target user.

The raw merchant embeddings 28 and the raw user embeddings 30 may be generated from the payments transaction records 24 by the word embedding process 27, which in one embodiment may be implemented as a Word2vec model or GloVe, for example. Typically, word embedding is a natural language modelling technique used to map words or phrases from a vocabulary to a corresponding vector of real numbers. As well as being amenable to processing by learning algorithms, this vector representation has two important and advantageous properties: it is a more efficient representation (dimensional reduction) and it is a more expressive representation (contextual similarity). Ideally, an embedding captures some of the semantics of the input by placing semantically similar inputs close together in the embedding space. Here, word embedding is used to map the transaction data records 24 to an embedding space, rather than words of a language, where each point in the embedding space may correspond to a unique merchant ID.

Although the word embedding process 27 is shown as being executed by the card payment processor 12, in another embodiment, the word embedding process 27 may be executed by a third party that forwards the raw merchant embeddings 28 and the raw user embeddings 30 to the card payment processor 12.

Figure 3:
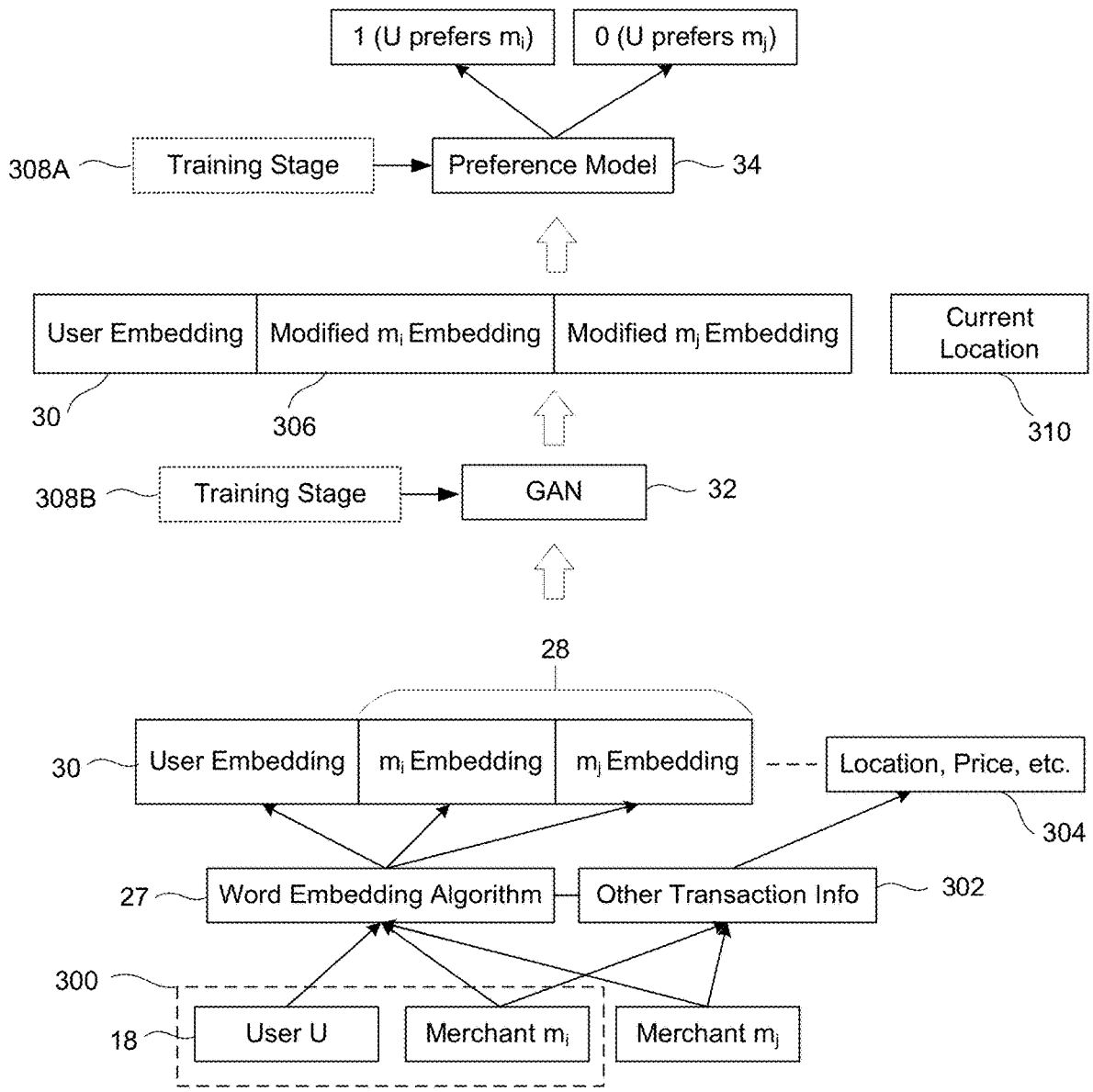
FIG. 3 is a diagram illustrating processing of the raw merchant embeddings and the raw user embeddings.

FIG. 3 is a diagram illustrating processing of the raw merchant embeddings 28 and the raw user embeddings 30 performed by the merchant recommendation system 25. The user embeddings 30 are created by first compiling all user-merchant pairs 300 in the payment transaction records 24. That is, for each payment transaction record 24, a pair of identifiers—user IDs (i.e., cardholder account) and merchant IDs, is exacted to indicate which user has made a payment to which merchants. The user-merchant pairs 300 are then grouped by distinct merchant IDs. Thus, each merchant group contains a sequence of users who have made payments to this merchant. The grouped user-merchant pairs 300 are then input to the word embedding process 27 where each user in a merchant group is treated as a word and each merchant group is treated as a document, and the word embedding process 27 generates a user embedding 30 for each user.

Similarly, to generate the merchant embeddings 28, all user-merchant pairs 300 are grouped by distinct user IDs. A list of all merchants that have been attended by a user is treated as a word and all such words are treated as a document. The word embedding process 27 is then used to generate a merchant embedding 28 for each merchant ID. The number of dimensions for each vector are chosen to be both efficient and effective for the task at hand. In one embodiment for example, each user embedding 30 may be represented as a 200 dimension float vector, while each merchant embedding 28 may be represented by approximately 400 dimensions for online and offline transactions.

Compared with word embedding used in natural language processing, merchant embeddings 28 have encoded features 304 related to the merchants 16 generated from other transaction metadata 302 that influence what merchants a user visits. Example of the features 304 encoded in the merchant embeddings 28 may include location of the merchants, transaction price, average merchant popularity, category of the merchants, and the like. For a merchant to be visited frequently by a user typically means that the physical location of the merchant has to be close to that of the user, i.e., the merchant and the user need to be in the same city for the user to frequent the merchant. Distance to different merchants also impacts preference of users. Next, the price or average amount of money spent at a merchant is factored into the user's choices of places to visit. The average popularity of a merchant is also reflected in the dataset as a whole by the frequency of a merchant ID in the cumulative 'text'. All of this is captured and expressed by the raw merchant embeddings 28.

Features such as location, number of transactions and cost may be obtained directly from the payment transaction records 26 or other statistics. For cuisine style, which is not available from the payment transaction records 24, the merchant recommendation system 25 may use the name of chain restaurants as a label for cuisine type according in one embodiment.

When training the preference model 34 to predict user merchant/restaurant preferences, for example, it is assumed that if two restaurant $r_i$ and $r_j$ are very close, and if $r_i$ is visited many more times than $r_j$, then a conclusion can be drawn that $r_i$ is preferred over $r_j$. The reason to recommend a close restaurant is due to the characteristics of the merchant embeddings 28 produced by the word embedding process 27. Merchant embedding 28 implicitly contain location information because in one location, similar merchants 16 have high chance of being visited by the same group of people from that location than other locations. Thus, merchant embedding 28 from the same place will be grouped together in the embedding space. It is an appropriate assumption when recommending restaurants to users 18 when the users 18 are present in their home city, but it can be problematic when recommending restaurants to users 18 when the users 18 are traveling away from their home city.

Figure 4A:
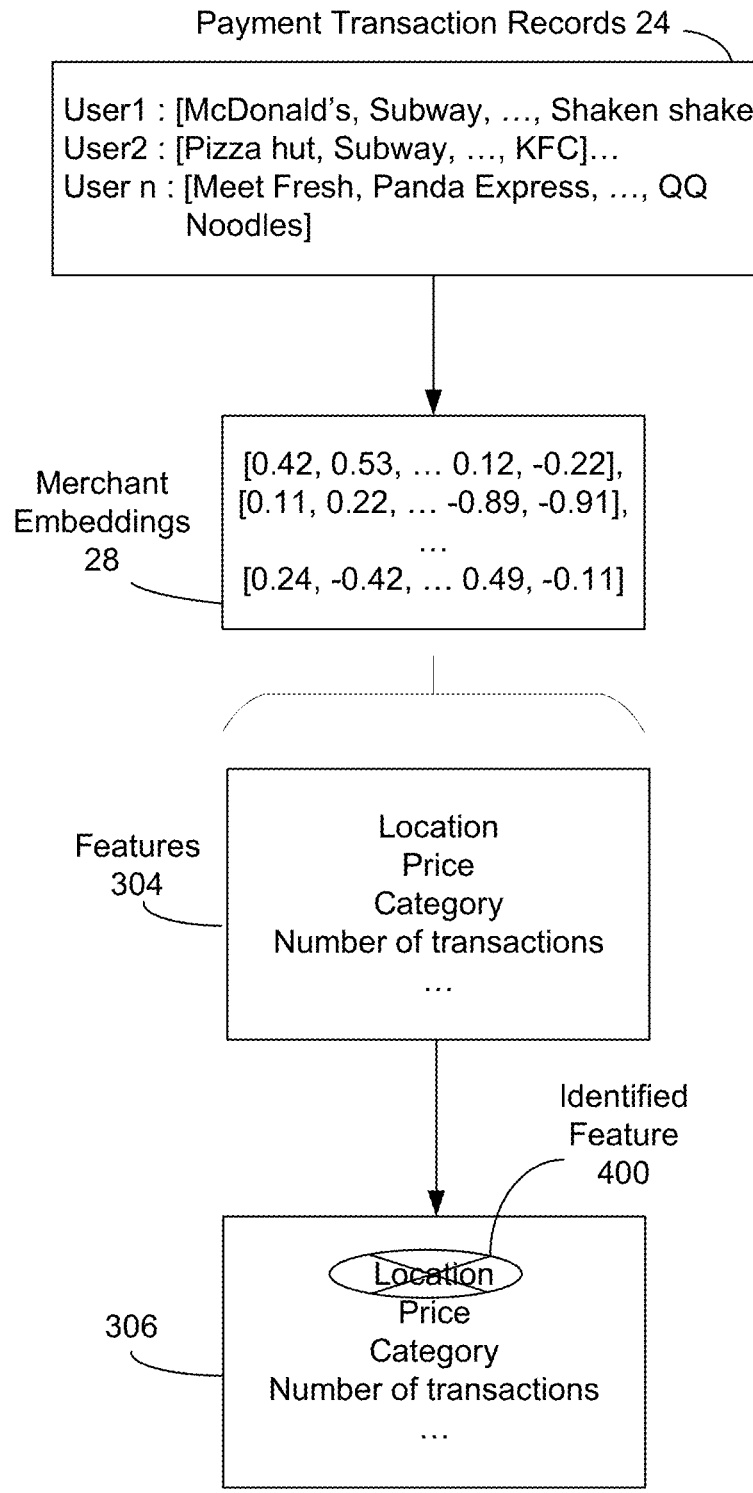
FIG. 4A is a diagram illustrating examples of payment transaction records, merchant embeddings and features thereof.

FIG. 4A is a diagram illustrating examples of payment transaction records 24, merchant embeddings 28 and features thereof. Several transaction records 24 are shown for User 1 through User n showing the names of merchants each user has transacted with. The word embedding process 27 generates the merchant embeddings 28 from the payment transaction records 24, where each merchant embedding is represented as a multidimensional vector of numbers in an embedding space and forms a point in that space.

The features 304 encoded in the merchant embeddings 28 may include location, price, category, and number of transactions (i.e., average merchant popularity), and the like. Due to the natural characteristic of the transaction data, merchants in the same location tend to be close to each other. For example, a McDonald's in San Francisco is closer to a Hilton Hotel in San Francisco than a McDonald's in Chicago. In this case, location is implicitly embedded into the embedding space and is a dominating factor. This makes translation of user preferences from one location to another inaccurate, with the system suggesting restaurants primarily having similar locations, rather than by the cuisine preference of the user.

However, since features 304 are implicitly embedded in the merchant embeddings 28 and entangled together, it can be challenging to determine a process to identify those individual features in the merchant embedding 28 and disentangle those features. One challenge is that there are multiple cities, and the location direction for all cities are different for each pair of cities. Therefore, the challenge is to map the features together to common spaces. As an example, consider merchant embeddings from two different locations (cities), as shown in FIG. 4B.

Figure 4B:
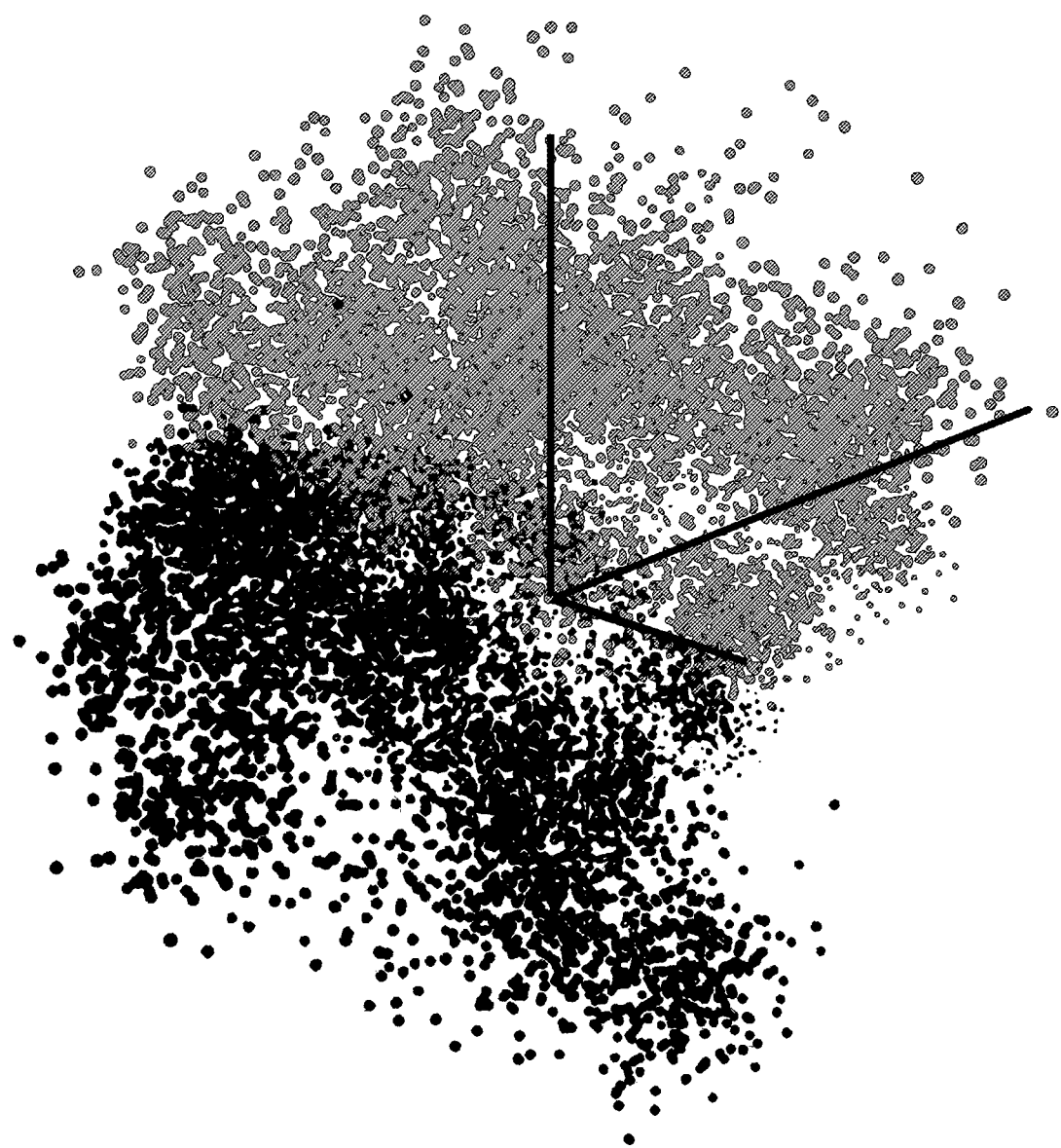
FIG. 4B is a diagram illustrating a principal component analysis (PCA) view of 200-dimension merchant embeddings of Subway® and McDonalds® restaurants in San Francisco (left cluster) and New York (right cluster).

FIG. 4B is a diagram illustrating a principal component analysis (PCA) view of 200-dimension merchant embeddings of Subway® and McDonalds® restaurants in San Francisco (left cluster) and New York (right cluster). The merchant embeddings from two locations are labeled using different colors from the PCA view of the embedding and are well separated by a linear hyperplane. From recommendation point of view, these merchant embeddings from San Francisco and New York should be aligned with each other since they represent the same restaurants from different locations. To make them similar, it is essential to remove the effect of location in the embeddings, while keeping the effects of all other information such as category information.

There is no single dimension corresponding to any one of the features, thus identifying the meaning of each embedding is an impossible task. Instead, the disclosed embodiments provide an algorithm to minimize the difference between the identified feature(s) such that no classifier can classify the embeddings based on such features.

To solve the problem of entangled merchant embeddings, the disclosed embodiments provide an unsupervised disentanglement method for the merchant embeddings. According to one aspect of the disclosed embodiments in order for the recommendation engine 36 to recommend a merchant/restaurant in any city for a particular user, the merchant recommendation system 25 first differentiates different subspaces within the embedding space that represent different features 304 such as location, price, or category. Referring again to FIG. 4A, the unsupervised process disentangles or otherwise removes an identified feature 400, such as location information, implicitly embedded in the merchant embeddings 28 when generating the modified merchant embeddings 306.

Referring again to FIGS. 2 and 3, according to one embodiment the disentanglement process is performed by the GAN 32 to remove an effect of an identified feature 400 by generating modified merchant embeddings that are free of the identified feature and are aligned with other ones of the plurality of features (block 202). In embodiments, the identified feature 400 removed from the embedding space by the GAN 32 is the location information. The process of removing location can also be applied to remove other features 304 in the embedding, however. Location is selected because the most common form of recommendation requires understanding users' spending patterns at one location, and predicting restaurants at a new city or location for those users. With location information removed from the merchant embeddings 28, the modified merchant embeddings 306 are aligned based on the other features 304 of the merchant embeddings in the embedding space.

Referring to again to FIG. 2, after the modified merchant embeddings 306 have been generated to remove the identified feature, the merchant recommendation system 25 automatically generates a list of merchant rankings based on the modified merchant embeddings, past preferences of a target user using the raw user embeddings, and a current location in which to make merchant recommendations (block 204). As shown in FIG. 3, the preference model 34 uses the raw user embeddings 30 and the modified merchant embeddings 306 of merchants in proximity to the current location 310 to indicate to the recommendation engine 36 which ones of merchants might be preferable to the target user.

Finally, the recommendation engine 36 provides the list of merchant rankings to the target user (block 206). Ideally, the recommendation engine 36 effectively recommend merchants/restaurants that are similar to ones preferred by a user when the user is traveling away from their home city. In embodiments, the recommendation engine 36 may provide the list of merchant rankings to the target user by displaying the list in a web browser or software app on user device 42.

The process of automatically generating the list of merchant rankings includes several operations. The first operation includes generating, by the preference model 34, merchant preferences for the target user based on the modified merchant embeddings and the raw user embeddings 30. Given a current location, the recommendation engine 36 searches for local merchants located within proximity of the current location. The recommendation engine 36 then ranks these local merchants based on the merchant preference of the target user.

Feature disentanglement using GAN 32 can be expanded to other types of merchant recommendation systems other than restaurants. For example, for travel services, the merchant recommendation system 25 may be adapted to provide such travel agent recommendations, or for hotel service, the merchant recommendation system 25 may be adapted to provide hotel recommendations.

Referring again to FIG. 3, the preference model 34 and the GAN 32 execute in two stages: in an offline training stage 308A and 308B, respectively, and in an online recommendation stage. During the training stage 308A, the machine learning preference model 34 is trained to learn different users' preferences over different restaurants. An intuition leveraged by the preference model 34 is that a user's preference over a restaurant is typically a relative ranking compared to another restaurant, instead of an absolute ranking. Based on this observation, the preference model 34 learns user preferences by comparing pairs of restaurants for each user. Specifically, data samples of two restaurants the target user has visited are extracted from all payment transaction records 24 within a learning time period. The user embeddings 30 and the modified merchant embeddings 306 of the two restaurants are concatenated and used as the input vector for the preference model 34. The preference model, which is a classifier, outputs a label of 1 or 0 to indicate whether the first restaurant or the second restaurant is more preferred (by comparing the frequencies that the user visited the two restaurants). Finally, given a current location of the user, the preference model 34 compares all pairs of restaurants within the location of the user and outputs a ranked list.

During the training stage 308B, the GAN 32 is trained to learn how to generate the modified merchant embeddings 306 from the raw merchant embeddings 28, where the modified embeddings 306 are free of the identified feature 400, such as location, while retaining all other features 304 at the same time. As used herein, the phrase "removing the identified feature" and "free of the identified feature" are meant to mean removing the effect of the identified feature 400 in the merchant embeddings.

Figure 5A:
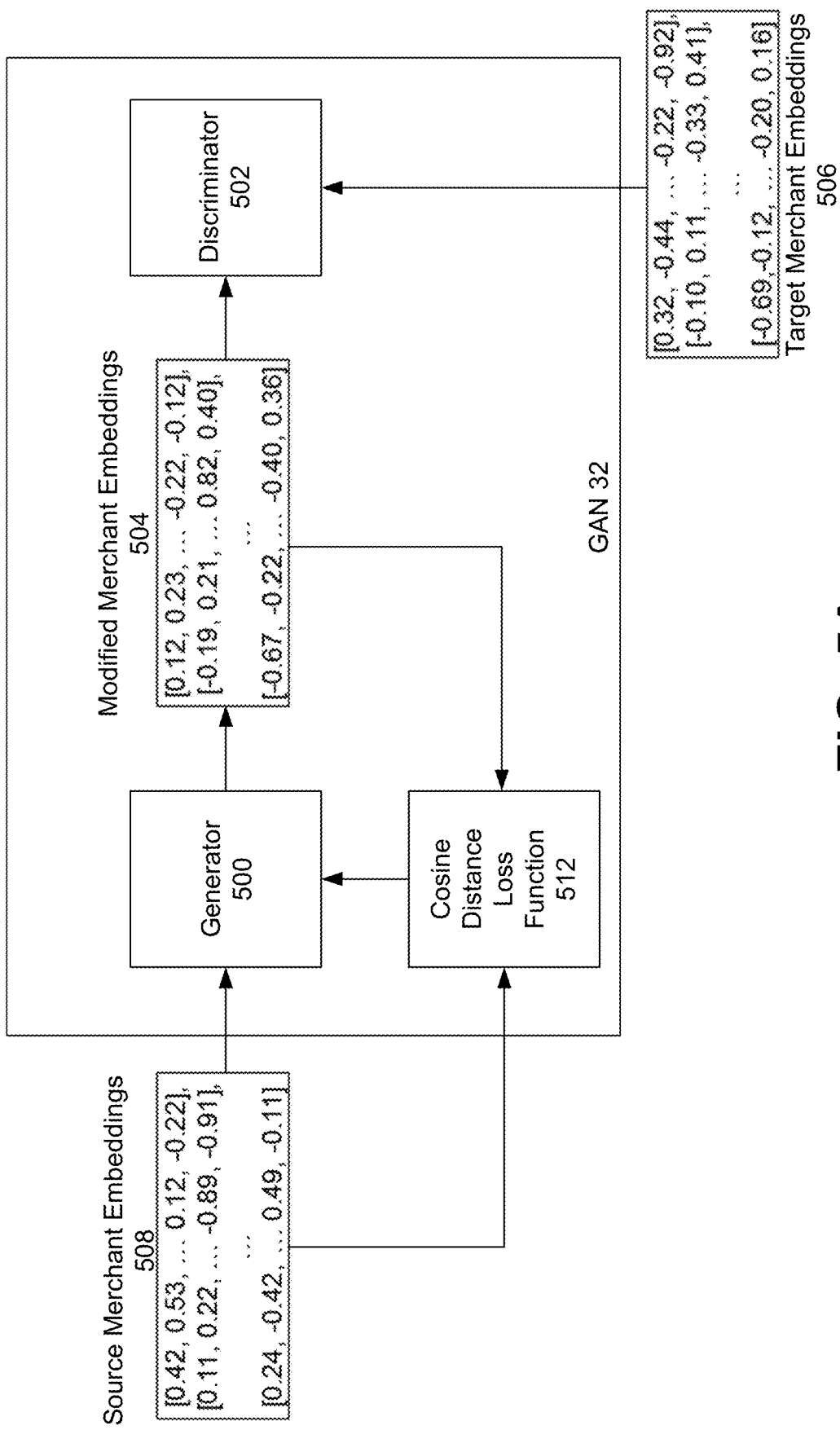
FIG. 5A shows a GAN structure during the training stage in accordance with one embodiment.

FIG. 5A shows a GAN structure during the training stage in accordance with one embodiment. According to embodiments, the GAN 32 is used as a domain-adversarial approach for learning a mapping function without a cross-location merchant mapping pair. The GAN 32 may include two main components: a generator 500 and a discriminator 502. The generator 500 receives source merchant embeddings 508 from a source location and attempts to generate modified merchant embeddings 504 in a manner that attempts to fool the discriminator 502, while the discriminator 502 receives target merchant embeddings 506 from a target location and attempts to distinguish the modified merchant embeddings 504 from the target merchant embeddings 506. In one embodiment, the home location of the target user is used as the source location and a current location from the target user is used as the target location.

The source merchant embeddings 508 are represented as a set X of n embeddings $X = x_1, \ldots, x_n$ from the source location. The target merchant embeddings 506 are represented as a set Y of m embeddings $Y = y_1, \ldots, y_m$ from the target location. The generator 508 generates the modified merchant embeddings 504 by applying a mapping function F to the set X of source merchant embeddings 508, $F(X) = F(x_1), \ldots, F(x_n)$, wherein the generator 500 uses $F(X)$ to map the modified merchant embeddings 504 to an embeddings space such that the discriminator 502 cannot tell the difference between $F(x_1), \ldots, F(x_n)$ and the set Y of the target merchant embeddings 506.

The discriminator 502 is trained to discriminate between elements randomly sampled from $F(X) = F(x_1), \ldots, F(x_n)$ and Y to identify the origin of a modified merchant embedding 504. The mapping function F is trained to prevent the discriminator 502 from making accurate origin predictions by making $F(X)$ and Y as similar as possible, while the discriminator 502 is configured to maximize its ability to identify the origin of the modified merchant embeddings 504.

In addition to removing location information or the effect thereof, the GAN 32 is further provided with feature enhancement components comprising a cosine distance loss of function 512 and a sigmoid distance loss of function (implemented within generator 500 and discriminator 502). The major function of the cosine distance loss function 512 is to ensure that the remaining features of the modified merchant embeddings 504 are retained after the identified feature 400 is removed by the disentanglement process. In order to achieve embedded feature retention, the feature enhancement component or cosine distance loss function 512 guarantees that the modified merchant embeddings 306 generated by the generator 500 are similar to the source merchant embeddings 508. Cosine similarity is a measure of similarity between two non-zero vectors of an inner product space that measures the cosine of the angle between them. The cosine of 0° is 1, and it is less than 1 for any angle in the interval $(0, \pi)$ radians. Cosine similarity is a judgment of orientation and not magnitude: two vectors with the same orientation have a cosine similarity of 1, two vectors oriented at 90° relative to each other have a similarity of 0, and two vectors diametrically opposed have a similarity of −1, independent of their magnitude. The cosine distance loss of function 512 outputs the measure of similarity to the generator 500 that is used as feedback by the generator 500 when continuing to generate the modified merchant embeddings 504.

The GAN 32 is trained until the discriminator 502 cannot tell the difference between the target merchant embeddings 506 and the modified merchant embeddings 504, which indicates the location information in the source merchant embeddings 508 is converted or mapped to the target merchant embeddings 506. The generator 500 and discriminator 502 may be implemented as deep neural networks according to embodiments.

Figure 5B:
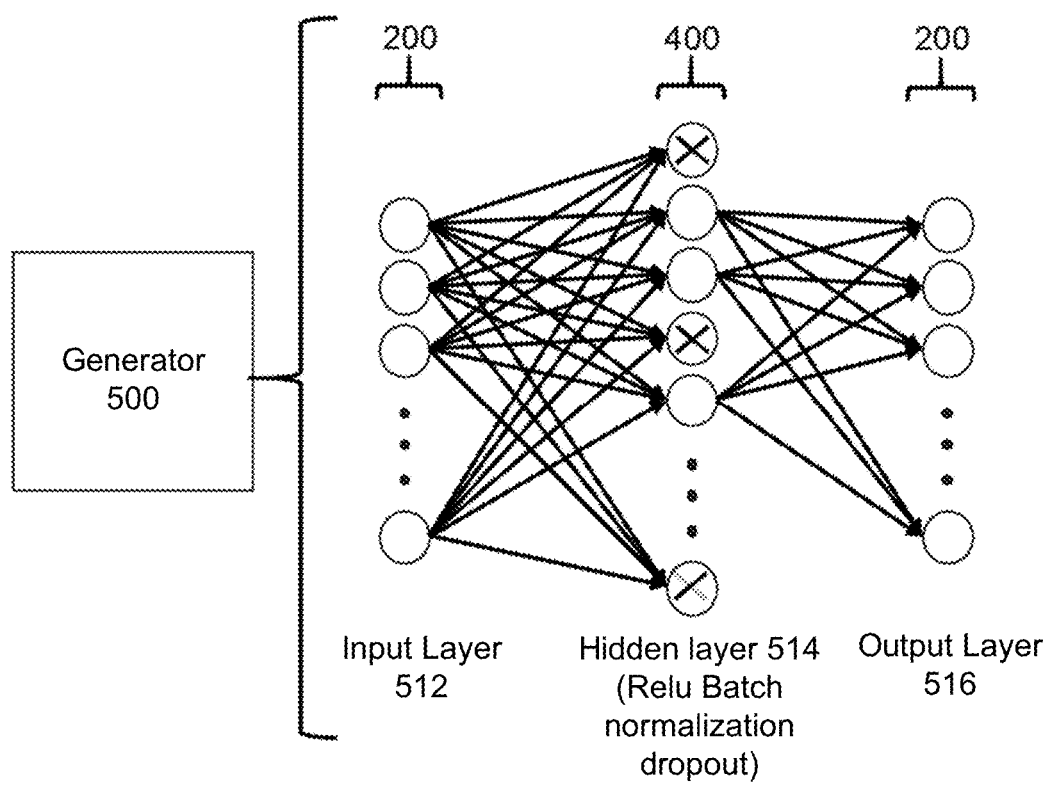
FIG. 5B illustrates an implementation of the generator according to one example embodiment.

FIG. 5B illustrates an implementation of the generator 500 according to one example embodiment. The generator 500 may implemented as a deep neural network comprising an input layer 512, one or more hidden layers 514 and an output layer 516. In one embodiment, the input layer 512 and the output layer 516 contain the same number of nodes that match the dimensionality of the input source merchant embeddings 508 and the output modified merchant embeddings 504. In this example, the input layer 512 and the output layer 516 may comprise approximately 200 nodes to match the 200 dimensions of the source merchant embeddings 508 and the modified merchant embeddings 504. In the example shown, the hidden layer 514 may comprise approximately 400 nodes. In one embodiment, the hidden layer 514 may be implemented with batch normalization to standardize the inputs to accelerate the training of the deep neural network. In one embodiment, the hidden layer 514 may be implemented with relu, which is a node using the rectifier activation function. In one embodiment, the hidden layer 514 may be implemented with dropout that prevents inter-dependencies from emerging between nodes (i.e., nodes do not learn functions that rely on input values from another node).

Figure 5C:
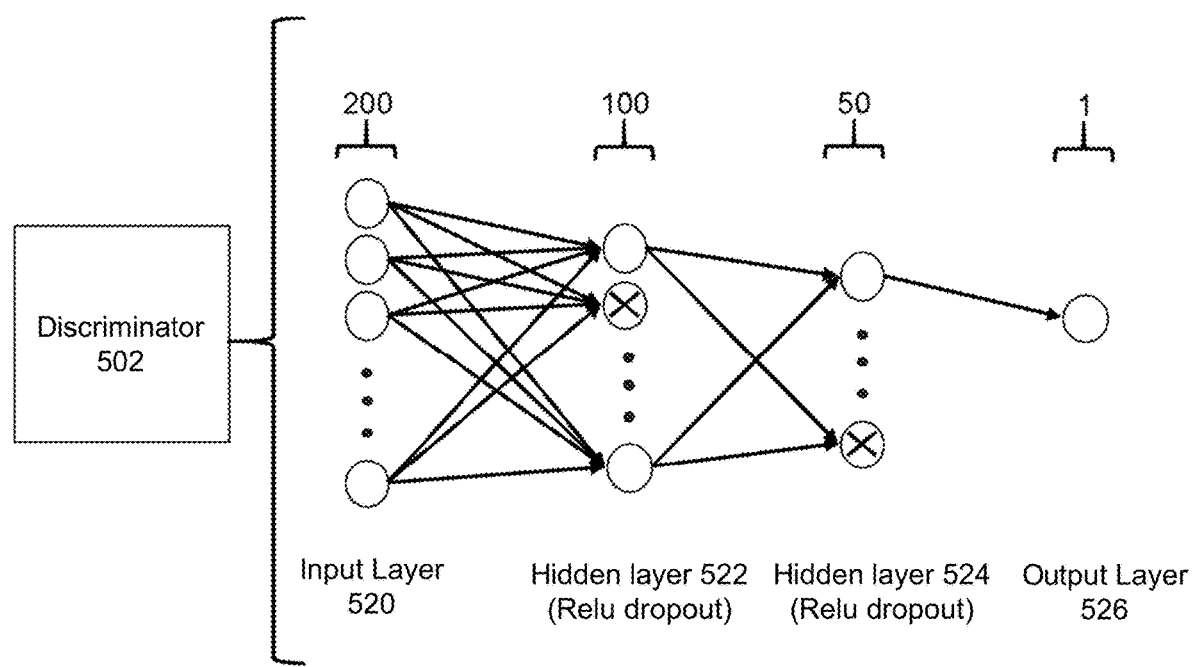
FIG. 5C illustrates an implementation of the discriminator according to one example embodiment.

FIG. 5C illustrates an implementation of the discriminator 502 according to one example embodiment. The discriminator 502 may implemented as a type of classifier deep neural network comprising an input layer 520, two or more hidden layers 522 and 524 and an output layer 526. In one embodiment, the input layer 520 may have a number of neurons or nodes matching the dimensionality of the input, e.g., 200, while the output layer 526 may have only a single node that outputs a "0" or "1", for instance. In the example shown, each successive hidden layer contains less nodes than the previous hidden layer. For example, hidden layer 522 comprises approximately 100 nodes, while hidden layer 524 comprises approximately 50 nodes. In one embodiment, the hidden layers 522 and 524 may be implemented with relu and/or dropout.

Assuming the function of the discriminator 502 that outputs a binary label x is defined D(x) and n indicates the number of the batch size of the embeddings, then a sigmoid cross entropy loss function $L_G$ for the generator 500 can be calculated as the follows, where $\alpha$ is the weight of cosine loss and $\beta$ is the weight of the sigmoid cross entropy loss.

$$L_G = \frac{1}{n}\sum_{i=1}^{n}(\alpha \cdot L_{cos}(F(X_i), X_i) + \beta \cdot L_{sigmoid}(D(F(X_i)), 1))$$

The generator loss function LG includes two parts. The first part is from the cosine distance loss function 512, which includes the cosine distance between the modified merchant embeddings 306 and the source merchant embeddings 508. The a controls how much the cosine distance loss function 512 retains the other features in the raw merchant embeddings when the identified feature (e.g., location) is removed. The second part of the loss indicates how similar the aligned modified merchant embeddings 306 from source space are to the target merchant embeddings 506 from the target spaces, or how much the generator 502 can fool the discriminator so that the discriminator is incapable identifying the modified merchant embeddings 306.

A loss function $L_D$ discriminator 502 can be written as:

$$L_D = \frac{1}{n}\sum_{i=1}^{n}(L_{sigmoid}(D(F(X_i)), 0) + L_{sigmoid}(D(Y_i), 1))$$

The discriminator loss also includes from two parts. The first part of the discriminator loss is the opposite of the second part of the generator loss, and indicates how good the discriminator 502 can identify the mapped source merchant embeddings 508. The second part of the discriminator loss indicates how good the discriminator can classify the source merchant embeddings 508 and the target merchant embeddings 506.

To deal with the disentanglement in multiple locations, e.g., cities, there are two options. One is to perform a pairwise procedure. In the pairwise procedure if the recommendation system is recommending restaurants across four cities A, B, C, D, then the GAN 32 selects one city, e.g., A as the target city, and then 32 maps the remaining cities B, C, D to the A embedding space. The second option is for the GAN to map A, B, C, D to a common embedding space so that the four cities all map with each other, but the other features in the embedding are still retained.

Example

A merchant embedding dataset was trained with real payment transaction records 24 from restaurants. This example focused mainly on a two location embedding disentanglement. For multi-location embedding disentanglement, a common one target embedding space may be selected, and all the other location embeddings may be mapped into the common target embedding space using the same method. In this example, word2vec (Mikolov et al.) is used to train the merchant embeddings, but other representations may be used, such as GloVe. All payment transaction records 24 from a half year of data were selected, and for each user, a query was made for a list of merchants the user visited during that six months. In natural language processing setting, a lexicon can be used to test the performance of the embedding alignment results. However, for merchant embedding, it was not possible to create such one-to-one pair of restaurants. Accordingly, the restaurants' name is used as a sufficient indicator to test the embedding alignment results.

In the example experiment, two sets of embeddings were extracted, and East West dataset and a New York (NY) and San Francisco (SF) dataset. The East West dataset focuses on chain restaurants having many branches. 15,952 merchant embeddings were extracted of Subway and McDonald's from ten east states and ten west states.

The NY SF dataset, shown in FIG. 4B, focuses on all the merchant embeddings from the two different cities. The NY SF dataset includes 108,790 restaurant embeddings from New York and 55,331 embeddings from San Francisco. In total, there are 164,121 embeddings and over 8,000 restaurant categories. Note that categories in this example refers to the names of the merchant restaurants.

Evaluation Method

The goal of the experiment was to map or disentangle or align the merchant embeddings of west states to the merchant embeddings of east states. The experiment empirically demonstrated the effectiveness of the disclosed unsupervised approach on several benchmarks. Results are presented using both classification accuracy and nearest neighbor method. The results show that unsupervised merchant embedding alignment via the GAN 32 can quantitatively and qualitatively align the merchant embedding.

During GAN 32 processing, newly generated modified merchant embeddings 306 and target merchant embeddings 506 are mapped into 3D space using principal components analysis (PCA) to see how the embeddings change over time.

Figure 6:
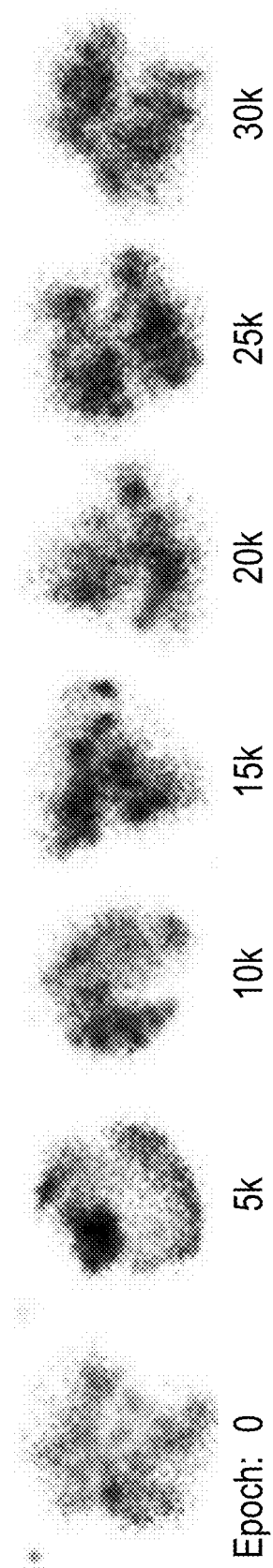
FIG. 6 illustrates a mapping transition into 3D space from newly generated modified merchant embeddings of west states (lighter points) to target merchant embeddings of east states (darker points).

FIG. 6 illustrates a mapping transition into 3D space from newly generated modified merchant embeddings of west states (lighter points) to target merchant embeddings 506 of east states (darker points). The mapping transition with epoch from 0 to 30 k is shown in FIG. 5. At epoch 0, lighter points and darker points are totally in two different groups, which proves that encoded location information affects the embeddings strongly. As the training epoch grows, the lighter colored points become closer and more similar to the darker points. At epoch 30 k, the two groups of points are finally merged together, which indicates there is less location difference between the two groups of embedding after the unsupervised merchant embedding disentanglement/alignment.

Classification Results

The same binary classification method as the embedding analysis was used to evaluate the modified merchant embeddings using the East and West dataset. The focus was on location and category classification. For location classification, east merchant embeddings were labeled as 1 and the generated west embeddings were labeled as 0. The example used 80% of the data as a training set and 20% of the data as testing data.

For category classification, Subway was labeled as 0 while McDonald's was labeled as 1. Different from location classification, the category classifier is trained merely on merchant embeddings of west states and then the category classifier was tested on embeddings of east states. To test the effect of feature enhancement on the GAN 32 performed by the cosine distance loss function 512, experiments were run on two GAN implementations, one GAN without the cosine distance loss function 512 and the other GAN with the cosine distance loss function 512.

Figure 7:
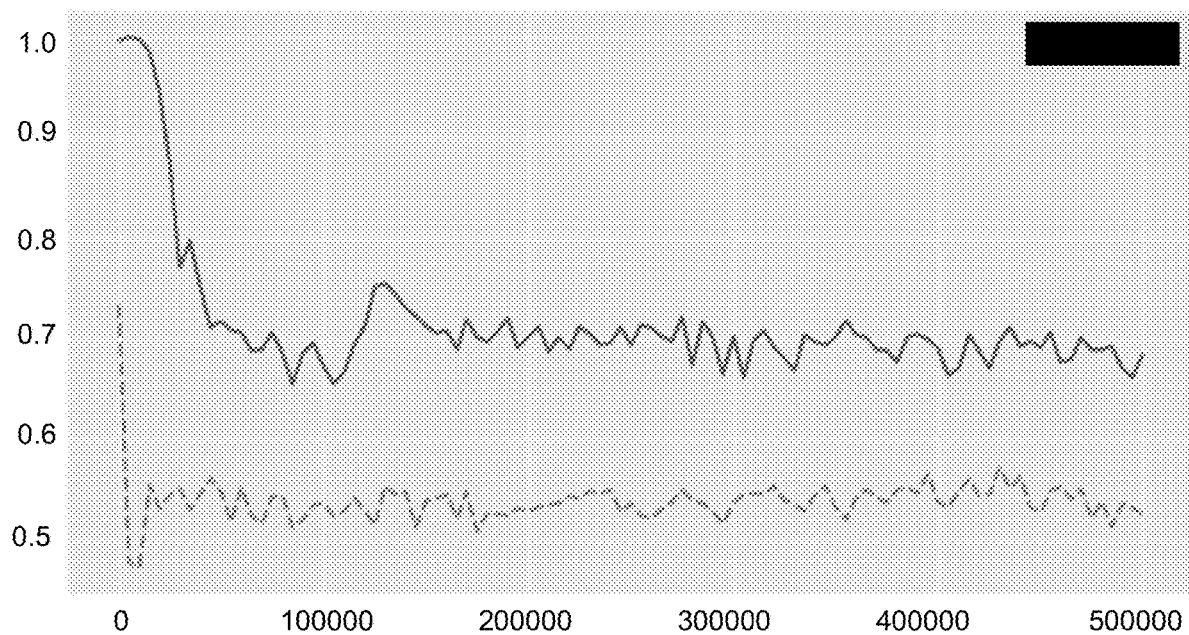
FIG. 7 shows the results of the classification using the GAN without feature enhancement.

FIG. 7 shows the results of the classification using the GAN without feature enhancement. The solid line indicates the accuracy of the location classification, while the dotted line indicates the accuracy of the category classification. As shown, the accuracy of location drops from around 100% to around 70% using the GAN without feature enhancement. However, the accuracy of category drops from around 75% to 50% as well. This indicates when the GAN without feature enhancement removes the location feature, other features may be removed as well.

Figure 8:
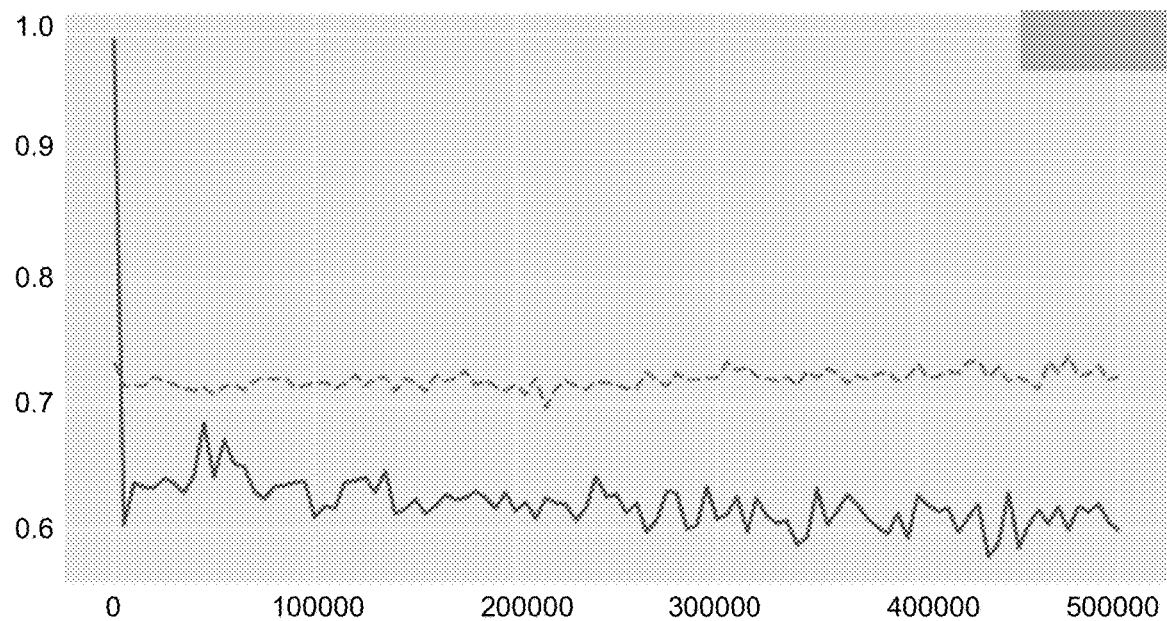
FIG. 8 shows the results of the classification using the GAN with feature enhancement.

FIG. 8 shows the results of the classification using the GAN with feature enhancement. Even though the accuracy of location classification drops from about 100% to 60%, as shown by the solid line, the accuracy of category classification remains above 70%. Therefore, the results prove that using the GAN with feature enhancement helps to retain other features encoded in embeddings when the GAN removes the location feature.

Recall that a controls how much the cosine distance loss function 512 retains the other features in the raw merchant embeddings when the identified feature (e.g., location) is removed. Another part of the experiment was to test how different values of the a in the cosine distance loss function 512 influences removal of the location feature and retention of the category feature, which also effects location and category classifications. The values of a were 1, 2.5, and 5.

Figure 9:
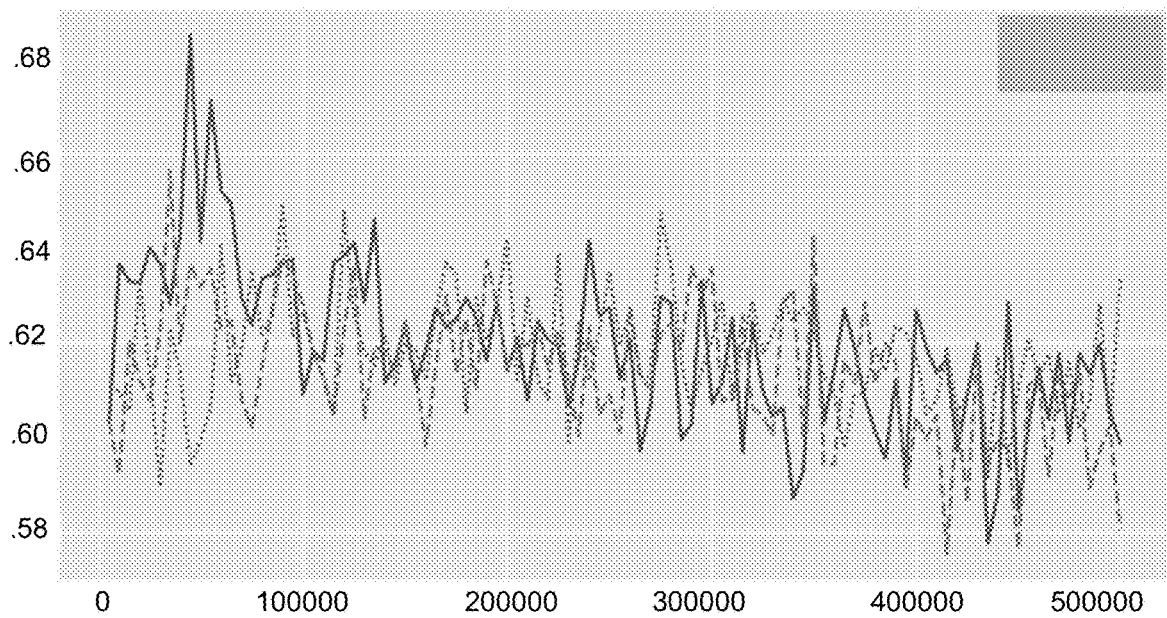
FIG. 9 illustrates results of a location classification with the different alpha (a) values.
Figures 10, 11, 12:
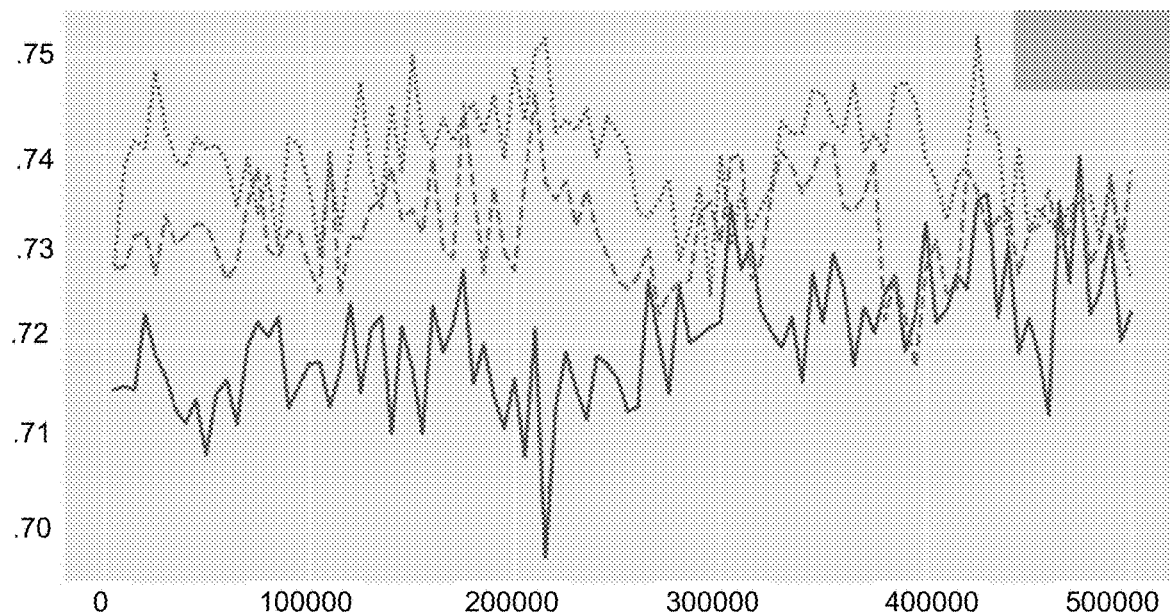
FIG. 10 illustrates results of a category classification with different a values.
FIG. 11 illustrates a Table showing results on nearest neighbor of the SF and NY dataset.
FIG. 12 illustrates a Table showing results on nearest neighbor of the East and West dataset.

FIG. 9 illustrates results of a location classification with the different a values, and FIG. 10 illustrates results of a category classification with different a values. In FIGS. 9 and 10, the solid line indicates the accuracy with an $\alpha$ of 1, the long-dashed line indicates the accuracy with an $\alpha$ of 2.5, and the short-dashed line indicates the accuracy with an $\alpha$ of 5. Note that the accuracy is removed at epoch 0 since accuracy is about 100%, which is too high compared to the other epochs. In FIG. 8, the short-dashed line is slightly higher than others, but generally the trends of three lines are similar. All accuracies decrease to about 60%.

In FIG. 10 for category classification accuracy, the short-dashed line is the highest while the solid line is the lowest. The long-dashed line is between them. This indicates that the accuracy of category classification increases when the weight of the cosine loss is increases as $\alpha$ increases. The a controls how much of the rest information is retained in the original embedding. But it is not true that the larger the a is, the better the category performance. It has been observed that, if $\alpha$ is set too large, the generator 500 has less freedom to explore the generating space, the balance of generator and discriminator can be reached. The mapping function of generator cannot be learned. The disclosed embodiments provide an effective unsupervised method to remove a dominate feature, such as location, implicitly embedded in raw merchant embeddings 28 generated from payment transaction records 24. To verify the other features are still retained in the merchant embeddings, chain restaurant names may be used as food category labels and the accuracy of the results of the location and category classifications can be visualized the during training, which shows the effectiveness of the unsupervised embeddings disentanglement using a GAN. With location removed from the merchant embedding, merchants/restaurants are aligned on the other features of the embedding, such as cuisine style, for example. The merchant recommendations system is thus operable to recommend similar merchants/restaurants for cardholders in traveling cities as in the home city.

Nearest Neighbor Measurement on Category

The classification results above shows the disentanglement process performs well for two categories. This section describes how well the process performs for all the restaurants in the test set. In this experiment, the San Francisco/New York dataset was used to perform the evaluation. The category similarity was measured by nearest neighbor, which is a form of proximity search that is an optimization problem of finding the point in a given set that is closest (or most similar) to a given point. A function C(e) was defined where "e" can be a merchant embedding(s). The function outputs the category label(s) for "e". A function $N_k(e)$ is also defined that outputs the top k=1, 5, 10 nearest restaurant embeddings of "e" and the embedding is in the target space.

Given embeddings X for a dataset, F(x) is defined as the label for x ∈ X on category. A function $N_k(x)$ is also defined that outputs the top k-nearest neighbor embeddings of x. G(x) is the mapping function from source domain to target domain. Given a query embedding $x_q$ from source space, $F(x_q)$ and $F(N_k(G(x_q)))$ are calculated. If $F(x_q) \in F(N_k(G(x_q)))$, the prediction is correct. Otherwise, the prediction is incorrect. The number of the correct predictions are counted and the precision for all the query embeddings are calculated.

Note that for number of the correct predictions, the higher the better. For accuracy of location, it should be as low as possible, which indicates how much the location difference is reduced between the source embedding space and the target embedding space. The generated or modified merchant embeddings were evaluated based on all datasets above.

FIG. 11 illustrates a Table showing results on nearest neighbor of the SF and NY dataset. FIG. 12 illustrates a Table showing results on nearest neighbor of the East and West dataset. The rows in the two tables indicate various value combinations for α and β. Column headings "N@1" "N@5" and "N@10" refer to the function $N_k(e)$ that outputs the top k=1, 5, 10 nearest restaurant embeddings of "e" and the embedding is in the target space. ACC@L refers to the location accuracy.

Recall that FIG. 4B shows a PCA view of merchant embeddings of Subway® and McDonalds® restaurants in SF (bottom cluster) and NY (top cluster). The experiment mapped the west embeddings to east embeddings. For NY SF dataset, there exists restaurants which are not in both SF and NY. Accordingly, two test settings were used, one with noise and one without noise. In the test with a noise setting, all the restaurants are considered. In the without the noise setting, restaurants only in one city are removed, thus the restaurants left are in both SF and NY. For SF to NY (with noise) setting, the restaurants that are only located in one city are kept. FIG. 10 shows that the best performance of nearest neighbor measurement occurs when α is 1 and β is 1, which indicates more category information is retained when the value of α is increased.

For SF to NY (without noise) setting, the experiment ensured that all restaurants are in both SF and NY. Note that since some restaurants in this setting are deleted, there are only 10,313 restaurants in NY while there are 3,736 restaurants in SF. In total there are 91 different categories. The best performance occurs when α is 5 and β is 1. These results indicate that about 62.7% chain restaurants in San Francisco can be found in the exact same restaurants in New York after applying the embedding alignment/disentanglement method within top 10 neighbors.

FIG. 12 illustrates a Table showing results on nearest neighbor of the East and West dataset. The best performance occurs when α is 5 and β is 1. Since there are only two categories for this dataset, the nearest neighbor results are better than the SF/NY dataset.

An unsupervised embeddings disentanglement method and system using a GAN for merchant recommendation has been described. It has been demonstrated that that merchant embeddings generated from payment transactions include a very rich set of features. Embodiments apply a GAN (optionally with a feature enhancement component) to generate modified merchant embeddings that disentangle or remove an identified feature, while retaining all other features. Effectiveness of the results was demonstrated by visualizing the generated embeddings, plotting the classification results and finding the top-k nearest restaurants for the same chain restaurants in different locations.

The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A computer-implemented method for training a recommendation system to provide merchant recommendations to a target user, comprising:

receiving, by one or more processors, historical payment transaction records of transactions made between users and merchants;

generating, by the one or more processors, from the historical payment transaction records a training set of raw merchant embeddings that represent the merchants and raw user embeddings that represent the users within an embedding space using a word embedding process, wherein the raw merchant embeddings include a plurality of embedded features from the historical payment transaction records including a location feature, a price feature, and a number of transactions feature, wherein the raw merchant embeddings include source merchant embeddings from a home location of the target user and target merchant embeddings from a target location;

training, by the one or more processors, a generative adversarial network (GAN) to generate modified merchant embeddings from the raw merchant embeddings, where the modified merchant embeddings have an effect of the location feature removed, the GAN comprising a generator and a discriminator, the GAN operational for:

receiving, by the generator, the source merchant embeddings as a set X of n embeddings X=x1, . . . , xn from the home location;

receiving, by the discriminator, the target merchant embeddings as a set Y of m embeddings Y=y1, . . . , ym from the target location; and generating, by the generator, the modified merchant embeddings by applying a mapping function F to the set X of the source merchant embeddings, F (X)=F (x1), . . . , F (xn), wherein the generator uses F (X) to map the modified merchant embeddings to an embeddings space such that the discriminator cannot tell a difference between F $(x_1)$, . . . , F $(x_n)$ and the set Y of the target merchant embeddings; and discriminating, by the discriminator, between elements randomly sampled from F (X)=F (x1), . . . , F (xn) and Y to identify an origin of the modified merchant embeddings;

continue, by the one or more processors, training the GAN until the discriminator cannot tell a difference between the target merchant embeddings and the modified merchant embeddings, indicating the location feature in the source merchant embeddings is mapped to the target merchant embeddings; and subsequent to the training and responsive to receiving a request for merchant recommendations in the target location for the target user, generating by the GAN a list of merchant rankings based on a new set of modified merchant embeddings generated from a new set of payment transaction records made between the users and merchants, past preferences of the target user, and the target location to recommend merchants in the target location.

2. The method of claim 1, wherein the plurality of embedded features include a cuisine type feature.

3. The method of claim 1, wherein generating a list of merchant rankings based on the new set of modified merchant embeddings further comprises:
  receiving, by the one or more processors, the new set of payment transaction records of transactions made between the users and the merchants;
  generating, by the one or more processors, from the new set of payment transaction records new raw merchant embeddings and new raw user embeddings;
  performing, by the one or more processors, a domain-adversarial approach to map the plurality of embedded features from the source merchant embeddings to the target location together to a common embedding space using the GAN that performs a disentanglement process on the new raw merchant embeddings to remove the effect of the location feature by generating a new set of modified merchant embeddings that are free of the location feature;
  using, by the one or more processors, a preference model to determine new past preferences of the target user for the merchants based on the new modified merchant embeddings and the new raw user embeddings;
  automatically generating, by the one or more processors, the list of merchant rankings based on the new set of modified merchant embeddings, the new past preferences of the target user, and the target location to recommend merchants in the target location; and
  providing, by the one or more processors, the list of merchant rankings to the target user.

4. The method of claim 3, wherein the disentanglement process performed by the GAN further comprises:
  receiving, by the generator, new source merchant embeddings represented as a new set X of n embeddings X=x1, . . . , xn from the source location comprising the home location of the target user; and
  receiving, by the discriminator, new target merchant embeddings represented as a new set Y of m embeddings Y=y1, . . . , ym from a new target location comprising a current location from a new target user.

5. The method of claim 4 further comprising:
  implementing the generator as a deep neural network comprising an input layer, one or more hidden layers and an output layer, wherein the input layer and the output layer contain a same number of nodes that match a dimensionality of the new source merchant embeddings and the new modified merchant embeddings; and
  implementing the discriminator as a type of classifier deep neural network comprising an input layer, two or more hidden layers and an output layer, wherein each successive hidden layer contains less nodes than a previous hidden layer.

6. The method of claim 4 further comprising: performing the disentanglement on multiple locations by one of: i) a pairwise procedure that selects a first location and then maps the new raw merchant embeddings from remaining locations to an embedding space of the first location; and ii) mapping the new raw merchant embeddings from the multiple locations to a new embedding space.

7. The method of claim 4 further comprising: calculating, by the generator, a loss function $L_G$ and calculating, by the discriminator, a loss function $L_D$, where:

$$L_G = \frac{1}{n}\sum_{i=1}^{n}(\alpha \cdot L_{cos}(F(X_i), X_i) + \beta \cdot L_{sigmoid}(D(F(X_i)), 1)))$$

$$L_D = \frac{1}{n}\sum_{i=1}^{n}(L_{sigmoid}(D(F(X_i)), 0) + L_{sigmoid}(D(Y_i), 1))$$

where D (x) is output by the discriminator, n indicates a batch size of the embeddings, $\alpha$ is a weight of cosine loss and $\beta$ is a weight of sigmoid cross entropy loss.

8. The method of claim 1 wherein automatically generating the list of merchant rankings further comprises:
  generating merchant preferences for the target user based on the modified merchant embeddings and the raw user embeddings;
  searching for local merchants located within proximity of a current location of the target user; and
  ranking the local merchants found within proximity of the target user based on the merchant preferences for the target user.

9. A merchant recommendation system, comprising:
  a transaction database storing historical payment transaction records;
  one or more processors having access to the transaction database; and
  a software component executed by the processor that is configured to:
  receive the historical payment transaction records made between users and merchants;
  generate from the historical payment transaction records a training set of raw merchant embeddings that represent the merchants and raw user embeddings that represent the users within an embedding space using a word embedding process, wherein the raw merchant embeddings include a plurality of embedded features from the historical payment transaction records including a location feature, a price feature, and a number of transactions feature, wherein the raw merchant embeddings include source merchant embeddings from a home location of a target user and target merchant embeddings from a target location;
  train a generative adversarial network (GAN) to generate modified merchant embeddings from the raw merchant embeddings, where the modified merchant embeddings have an effect of the location feature removed, the GAN comprising a generator and a discriminator, the GAN operational to:
    receive, by the generator, the source merchant embeddings as a set X of n embeddings X=x1, . . . , xn from the home location;
    receive, by the discriminator, the target merchant embeddings as a set Y of m embeddings Y=y1, . . . , ym from the target location; and
    generate, by the generator, the modified merchant embeddings by applying a mapping function F to the set X of the source merchant embeddings, F (X)=F ($x_1$), . . . , F ($x_n$), wherein the generator uses F (X) to map the modified merchant embeddings to an embeddings space such that the discriminator cannot tell a difference between F ($x_1$), . . . , F ($x_n$) and the set Y of the target merchant embeddings; and discriminate, by the discriminator, between elements randomly sampled from F (X)=F (x1), ..., F (xn) and Y to identify an origin of the modified merchant embeddings;

continue, by the one or more processors, to train the GAN until the discriminator cannot tell a difference between the target merchant embeddings and the modified merchant embeddings, indicating the location feature in the source merchant embeddings is mapped to the target merchant embeddings; and subsequent to training and responsive to receiving a request for merchant recommendations in the target location for the target user, generating by, the GAN a list of merchant rankings based on a new set of modified merchant embeddings generated from a new set of payment transaction records made between the users and merchants, and the target location to recommend merchants in the target location.

10. The system of claim 9, wherein the plurality of embedded features include a cuisine type feature.

11. The system of claim 9, the software component further configured to:
receive, by the one or more processors, the new set of payment transaction records of transactions made between the users and the merchants;
generate, by the one or more processors, from the new set of payment transaction records new raw merchant embeddings and new raw user embeddings;
perform, by the one or more processors, a domain-adversarial approach to map the plurality of embedded features from the source merchant embeddings to the target location together to a common embedding space using the GAN that performs a disentanglement process on new the raw merchant embeddings to remove the effect of the location feature by generating a new set of modified merchant embeddings that are free of the location feature;
use, by the one or more processors, a preference model to determine new past preferences of the target user for the merchants based on the new modified merchant embeddings and the new raw user embeddings;
automatically generate, by the one or more processors, the list of merchant rankings based on the new set of modified merchant embeddings, the new past preferences of the target user, and the target location to recommend merchants in the target location; and
provide, by the one or more processors, the list of merchant rankings to the target user.

12. The system of claim 11, wherein the GAN is further configured to:
receive, by the generator, new source merchant embeddings represented as a new set X of n embeddings $X=x_1, \ldots, x_n$ from the source location comprising the home location of the target user; and
receive, by the discriminator, new target merchant embeddings represented as a new set Y of m embeddings $Y=y_1, \ldots, y_m$ from the new target location comprising a current location from a new target user.

13. The system of claim 11, wherein the software component is further configured to:
implement the generator as a deep neural network comprising an input layer, one or more hidden layers and an output layer, wherein the input layer and the output layer contain a same number of nodes that match a dimensionality of the new source merchant embeddings and the new modified merchant embeddings; and implement the discriminator as a type of classifier deep neural network comprising an input layer, two or more hidden layers and an output layer, wherein each successive hidden layer contains less nodes than a previous hidden layer.

14. The system of claim 11, wherein the software component is further configured to: perform the disentanglement on multiple locations by one of: i) a pairwise procedure that selects a first location and then maps the new raw merchant embeddings from remaining locations to an embedding space of the first location; and ii) mapping the new raw merchant embeddings from the multiple locations to a new embedding space.

15. The system of claim 11, wherein the software component is further configured to: calculate, by the generator, a loss function $L_G$ and calculate, by the discriminator, a loss function $L_D$, where:

$$L_G = \frac{1}{n}\sum_{i=1}^{n}(\alpha \cdot L_{cos}(F(X_i), X_i) + \beta \cdot L_{sigmoid}(D(F(X_i)), 1)))$$

$$L_D = \frac{1}{n}\sum_{i=1}^{n}(L_{sigmoid}(D(F(X_i)), 0) + L_{sigmoid}(D(Y_i), 1))$$

where D (x) is output by the discriminator, n indicates a batch size of the embeddings, $\alpha$ is a weight of cosine loss and $\beta$ is a weight of sigmoid cross entropy loss.

16. The system of claim 9, wherein when generating the list of merchant rankings, the software component is further configured to:
generate merchant preferences for the target user based on the modified merchant embeddings and the raw user embeddings;
search for local merchants located within proximity of a current location of the target user; and
rank the local merchants found within proximity of the target user based on the merchant preferences for the target user.

17. A non-transitory computer-readable medium containing program instructions for training a recommendation system to provide merchant recommendations to a target user, the program instructions for:
receiving, by one or more processors, historical payment transaction records of transactions made between users and merchants;
generating, by the one or more processors, from the historical payment transaction records a training set of raw merchant embeddings that represent the merchants and raw user embeddings that represent the users within an embedding space using a word embedding process, wherein the raw merchant embeddings include a plurality of embedded features from the historical payment transaction records including a location feature, a price feature, and a number of transactions feature, wherein the raw merchant embeddings include source merchant embeddings from a home location of the target user and target merchant embeddings from a target location;
training, by the one or more processors, a generative adversarial network (GAN) to generate modified merchant embeddings from the raw merchant embeddings, where the modified merchant embeddings have an effect of the location feature removed, the GAN comprising a generator and a discriminator, the GAN operational for:

receiving, by the generator, the source merchant embeddings as a set X of n embeddings X=x1, ..., xn from the home location;

receiving, by the discriminator, the target merchant embeddings as a set Y of m embeddings Y=y1, ..., ym from the target location; and generating, by the generator, the modified merchant embeddings by applying a mapping function F to the set X of the source merchant embeddings, F (X)=F (x1), ..., F (xn), wherein the generator uses F (X) to map the modified merchant embeddings to an embeddings space such that the discriminator cannot tell a difference between F (x1), ..., F (xn) and the set Y of the target merchant embeddings; and discriminating, by the discriminator, between elements randomly sampled from F (X)=F (x1), ..., F (xn) and Y to identify an origin of the modified merchant embeddings;

continuing, by the one or more processors, training the GAN until the discriminator cannot tell a difference between the target merchant embeddings and the modified merchant embeddings, indicating the location feature in the source merchant embeddings is mapped to the target merchant embeddings; and subsequent to the training and responsive to receiving a request for merchant recommendations in the target location for the target user, generating by the GAN a list of merchant rankings based on a new set of modified merchant embeddings generated from a new set of payment transaction records made between users and merchants, and the target location to recommend merchants in the target location.

* * * * *